(12) United States Patent
Sah et al.

(10) Patent No.: US 8,277,661 B2
(45) Date of Patent: Oct. 2, 2012

(54) MICROPOROUS MOLECULAR SEPARATION MEMBRANE WITH HIGH HYDROTHERMAL STABILITY

(75) Inventors: Ashima Sah, Calcutta (IN); Hessel Lennart Castricum, Amsterdam (NL); Jaap Ferdinand Vente, Alkmaar (NL); David Hermanus Adrianus Blank, Enschede (NL); Johan Evert Ten Elshof, Enschede (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 310 days.

(21) Appl. No.: 12/160,992

(22) PCT Filed: Jan. 16, 2007

(86) PCT No.: PCT/NL2007/050017
§ 371 (c)(1),
(2), (4) Date: Nov. 14, 2008

(87) PCT Pub. No.: WO2007/081212
PCT Pub. Date: Jul. 19, 2007

(65) Prior Publication Data
US 2009/0246114 A1    Oct. 1, 2009

(30) Foreign Application Priority Data
Jan. 16, 2006 (EP) ..................... 06100388

(51) Int. Cl.
*B01D 61/00* (2006.01)
*B01D 39/00* (2006.01)
*B01D 29/00* (2006.01)
*B01D 39/14* (2006.01)

(52) U.S. Cl. ............ 210/652; 210/490; 210/500.25; 210/500.27; 210/500.26; 210/500.36; 427/344; 427/245; 428/447; 428/622

(58) Field of Classification Search ............. 210/500.25, 210/500.26, 490, 500.27, 500.36, 640, 652; 428/447, 622; 96/4–10; 95/45–52; 427/244–245
See application file for complete search history.

(56) References Cited

U.S. PATENT DOCUMENTS
4,470,831 A    9/1984   Hirose et al.
(Continued)

FOREIGN PATENT DOCUMENTS
EP    0 468 663 A    1/1992
(Continued)

OTHER PUBLICATIONS

K. J. Shea, et al., "Bridged Polysilsesquioxanes. Molecular-Engineered Hybrid Organic-Inorganic Materials," *Chemistry of Materials*, vol. 13, 2001, pp. 3306-3319.

(Continued)

*Primary Examiner* — Ana Fortuna
(74) *Attorney, Agent, or Firm* — Gilberto M. Villacorta; Sunit Talapatra; Foley & Lardner LLP (57) ABSTRACT

A hydrothermally stable, microporous organic-inorganic hybrid membrane based on silica, having an mean pore diameter of between 0.2 and 1.5 nm, is characterised in that between 5 and 40 mole % of the Si—O—Si bonds have been replaced by moieties having the one of the formulas: Si—{[$C_mH_{(n-1)}$X]—Si—}$_q$, Si—[$C_mH_{(n-2)}X_2$]—Si or Si—$C_mH_n$—Si{($C_mH_n$)—Si—}$_y$, in which m=1-8, n=2m, 2m−2, 2m−4, 2m−6 or 2m−8; provided that n≧2, X=H or (CH$_2$)$_p$Si, p=0 or 1, and q=1, 2, 3 or 4. The membrane can be produced by acid-catalysed hydrolysis of suitable bis-silane precursors such as bis(trialkoxysily)alkanes, preferably in the presence of monoorganyl-silane precursors such as trialkoxyalkylsilanes.

16 Claims, 2 Drawing Sheets

U.S. PATENT DOCUMENTS

| | | | |
|---|---|---|---|
| 6,818,133 B1 * | 11/2004 | Wolter et al. | 210/640 |
| 7,091,287 B2 * | 8/2006 | Kwon et al. | 525/474 |
| 7,244,797 B2 * | 7/2007 | Kurihara et al. | 526/241 |
| 7,582,214 B2 * | 9/2009 | Brook et al. | 210/656 |
| 7,632,771 B2 * | 12/2009 | Iacopi et al. | 502/4 |
| 7,655,738 B2 * | 2/2010 | Keller et al. | 525/477 |
| 7,767,180 B2 * | 8/2010 | Panz et al. | 423/339 |
| 7,790,292 B2 * | 9/2010 | Colborn et al. | 428/447 |

FOREIGN PATENT DOCUMENTS

| | | |
|---|---|---|
| EP | 1 089 806 B1 | 6/2004 |
| JP | 2001-062265 A | 3/2001 |
| JP | 2003-047831 A | 2/2003 |
| JP | 2004-275943 A | 10/2004 |
| WO | WO 99/61140 A | 12/1999 |

OTHER PUBLICATIONS

J. Campaniello, et al., "Long-Term Pervaporation Performance of Microporous Methylated Silica Membranes," *Chemical Communications*, 2004, pp. 834-835.

R. M. de Vos, et al., "Hydrophobic Silica Membranes for Gas Separation," *Journal of Membrane Science, Elsevier Science*, Amsterdam, NL, vol. 158, No. 1-2, Jun. 1, 1999, pp. 277-288.

D. A. Loy, et al., "Bridged Polysilsesquioxanes, Highly Porous Hybrid Organic-Inorganic Materials," *Chemical Reviews*, vol. 95, 1995, pp. 1431-1442.

Wang, et al., "Synthesis of Periodic Mesoporous Ethylenesilica Under Acidic Conditions," *Chemistry of Materials*, vol. 16, 2004, pp. 1756-1762.

Renate M. De Vos, et al., "Improved performance of silica membranes for gas separation", *Journal of Membrane Science.*, 143, 1998, pp. 37-51.

Yongde Xia et al., "High Surface Area Ethylene-Bridged Mesoporous and Supermicroporous Organosilica Spheres", *Microporous and Mesopororous Materials*, 2005, 86, pp. 231-242.

Yunfeng Lu et al., "Evaporation-Induced Self-Assembly of Hybrid Bridged Silsesquioxane Film and Particulate Mesophases with Integral Organic Functionality", *J. Am. Chem. Soc.*, 2000, 122, pp. 5258-5261.

R.S.A. De Lange, et al., "Formation and Characterization of Supported Microporous Ceramic Membranes Prepared by Sol-Gel Modification Techniques", *Journal of Membrane Science*, 99, 1995, pp. 57-75.

International Search Report for PCT/NL2007/050017, dated May 4, 2007, 4 pages.

* cited by examiner

MICROPOROUS MOLECULAR SEPARATION MEMBRANE WITH HIGH HYDROTHERMAL STABILITY

The invention relates to a microporous organic-inorganic hybrid membrane suitable for gas and liquid separations and to a process for producing such a membrane.

BACKGROUND

The state-of-the-art microporous pure silica membranes have shown good separation properties in both gas and liquid separations, but suffer from water adsorption at room temperature due to the hydrophilicity of the silica surface. De Vos et al. (*J. Membr. Sci.* 158, 1999, 277-288; *J. Membr. Sci.* 143, 1998, 37; EP-A 1089806) developed hydrophobic silica membranes (also referred to as methylated silica membranes) for separation of gasses and liquids and proposed a method for reducing water molecule interaction by incorporation of a precursor containing hydrophobic groups. Methylated silica membranes were further studied for the dehydration by pervaporation of organic solvents by Campaniello et al. (*Chem. Commun.*, 2004, 834-835). They found that the decrease in water flux could be restored by increasing the methyl content (hydrophobicity) of the membranes. Using this approach it was possible to achieve a satisfactory performance up to temperatures of 95° C. However, these membranes are not stable at higher temperatures, which are necessary for separating water from organic solvents. As a result the observed selectivity decreases, leading to failure within a few weeks.

Wang et al. (*Chem. Mater.* 2004, 16, 1756-1762) describe the synthesis of mesoporous ethylene-silica by acid-catalysed hydrolysis of bis(triethoxysilyl)ethane (BTESE) in the presence of a poly(ethylene oxide) surfactant as a pore former. Similarly, Xia and Mokaya (*Micropor. Mesopor. Mater.* 2005, 86, 231-242) disclose the synthesis of spherical microporous material containing bis-silylethane bridges by base-catalysed hydrolysis of BTESE in the presence of a cationic surfactant as a pore former.

Lu et al. (*J. Am. Chem. Soc.* 2000, 122, 5258-5261) describe the preparation of thin mesoporous periodically arrayed films containing bis-silyl-organic bridges, also using surfactants as pore formers. They report calculated pore diameters of 1.8 nm and 2.5 nm for membranes produced using cationic an anionic surfactants, respectively.

Shea and Loy (*Chem. Mater.* 2001, 13, 3306-3319) present an overview on materials based on bridged polysilsesquioxanes, and provide methods of controlling the properties of the porous materials made. They report that under particular conditions, e.g. long flexible bridges as found in bis(triethoxysilyl)octane (BTESO), and the use of acid catalyst, the porous materials can collapse, leading to dense gels. Further an increase in pore size of gels with increasing length of the alkylene-bridging group was demonstrated for base-catalysed reaction conditions. No report has been made about a material that possesses micropores in the absence of larger mesopores or macropores.

These prior art materials are typically periodic mesoporous organosilicas (PMO), with an average pore size in the mesoporous region with a diameter of >1.5 nm, and normally made in the form of monoliths with typical dimensions in the order of centimetres. Proposed applications are in the field of chromatography. Other applications that have been proposed range from surface modifiers and coatings to catalysts. These materials can be either dense or porous. In general a wide range of pore sizes is observed, and mesopores up to 50 nm coexist with macropores larger than 50 nm. In addition to these pores, micropores smaller than 2 nm may or may not be present. These prior art methods and products do not provide microporous (<2 nm) separation membranes that are sufficiently thermally stable and selective to allow for the continuous and effective separation of gasses or liquids.

DESCRIPTION OF THE INVENTION

It was found that a microporous organic-inorganic hybrid membrane based on silica, which allows the separation of gasses and liquids with an average pore size of less than 1.5 nm and which is hydrothermally resistant up to at least 150° C., can be produced by sol-gel technology using a bis-silyl, tris-silyl etc. precursor. Furthermore, it was found that the use of organic templates for forming the pores can be dispensed with when using the bis-silyl precursors.

In pure silica, the Si atoms are bonded to four oxygen atoms that are linked to other Si atoms. Apart from these siloxane (Si—O—Si) bridges, Si atoms are bonded to non-bridging oxygen containing groups (such as —O and —OH). In methylated silica, as proposed by De Vos (above), these non-bridging groups are partly replaced by methyl ($CH_3$) groups. According to the current invention, in comparison to silica, between 5 and 40%, in particular between 5 and 24% or between 24 and 25% or between 25 and 40%, preferably between 8 and 24 or between 24 and 25% or between 25 and 30%, of the oxygens in the siloxane bonds (Si—O—Si) in the selective separating membrane layer have been replaced by one or more linear, branched or cyclic organic groups. Particular ranges of this replacement are between 8 and 23%, between 10 and 21% and between 10 and 25%.

The resulting organosilicon moieties may be represented by the formulas:

$$Si—\{[C_mH_{(n-1)}X]—Si—\}_q, Si—[C_mH_{(n-2)}X_2]—Si \text{ or } Si—C_mH_n—Si\{(C_mH_n)—Si\}_y$$

in which:

m=1-8, n=2m, 2m−2, 2m−4, 2m−6 or 2m−8; provided that n≧2,

X=H or $(CH_2)_p Si$, p=0 or 1, q=1, 2 or 3 or 4, y=2 or 3.

Depending on the values of X, q and y, these groups may have the following formulas:

[I]

[II]

[III]

[IV]

[V]

[VI]

-continued

[VII]

[VIII]

Where the membrane of the invention only contains bridges with formula I, in the absence of bridges with formulas II-VIII, the maximum proportion of Si—O—Si bonds replaced by Si—$C_mH_n$—Si is 25%. Where also bridges of formulas II-VI are present, the total proportion of Si—$C_mH_n$—Si bonds can be higher: up to 33.3% for II, 37.5% for III and V, and 40% for IV and VI. Also, the cyclic variants of formulas II-IV (the terminal silicons being on a and the same) are contemplated.

Preferred membranes are based on silica in which m=1-4, especially 2 or 3, n=2m, or m=6, n=2m−2 or 2m−8, and X=H. Examples include: Si—$CH_2$—Si, Si—$CH_2$—$CH_2$—Si, Si—$CH_2$—$CH_2$—$CH_2$—Si, Si—$CH_2$—CH=CH—$CH_2$—Si and longer homologues, Si—$CH_2$—CH($CH_3$)—$CH_2$—Si, Si-cyclohexylene-Si, Si-phenylene-Si, Si—$CH_2$—CH(—$CH_2$—Si)$_2$, Si—$CH_2$—CH(—Si)$_2$, [Si($CH_2$)]$_3$ rings, [Si($CH_2$—$CH_2$)]$_3$ rings, [Si($CH_2$)]$_4$ rings, [Si($CH_2$—$CH_2$)]$_4$ rings, etc.

In these formulas, the remaining bonds to the silicon atoms have been omitted, but it will be appreciated that the silicon atoms will typically be bound to up to three other atoms, which are either oxygen atoms (connecting two silicon atoms) or carbon atoms of connecting groups —[$C_mH_{(n-1)}$X]— or non-bridging —O, —OH, or other monovalent groups as indicated below. The term 'monovalent' is used to denote atoms or groups having one and only one valency available for binding, and does not imply a specific type of binding, even though the bonds with silicon will typically be more covalent than ionic.

The monovalent organic moiety may be any group having from 1 to 10 carbon atoms, which is connected to silicon via a carbon atom. Such moieties may be represented by the general formula —$C_rH_sQ$, wherein r=1-10, s=2r, 2r−2, 2r−4 or 2r−6; provided that s≧2, Q=H, COOH, COOR, $NH_2$, NHR, $NR_2$, F, SH, SR, OR, OC(O)R or NHC(O)R, R=$C_1$-$C_6$ alkyl, especially $C_1$-$C_4$ alkyl, preferably methyl or ethyl, or RO is a deprotonated residue of a β-diketo compound such as acetylacetone or alkyl acetoacetate.

Examples of such moieties include groups of the formulas ($CH_2$)$_t$Q, ($CH_2$)$_u$$C_6H_4$Q', wherein t=1-5, preferably 1-3, u=0-4 and Q'=H, $CH_3$, $OCH_3$, or F. Other preferred examples of moieties having formula —$C_rH_sQ$ are linear or branched $C_1$-$C_6$ alkyl, especially methyl, ethyl, propyl or isopropyl.

Where reference is made to silicon bound to three or four oxygen atoms, the same applies to other metals, M and M', in particular yttrium, lanthanum, titanium, zirconium, hafnium, aluminium, gallium, germanium, and tin, leading to the formulas in which Si—O—Si are partly replaced by M—O—Si, M-O-M, and M-O-M', e.g. Ge—O—Si, Y—O—Si, Ti—O—Si, Ti—O—Ti, Zr—O—Si, Zr—O—Zr and Ti—O—Zr.

As indicated above, the membranes of the invention can also contain silicon atoms bound to monovalent carbon-linked organyl groups in addition to Si—O—Si bonds and Si—{[$C_mH_{(n-1)}$X]—Si}$_q$ bonds. In a particular embodiment, between 1 and 25%, preferably between 5 and 18% of the groups bound to silicon are such monovalent groups, i.e. the molar ratio of such non-bridging organic groups and all bonding groups together with the non-bridging —O, —OH groups is between 0.01 and 0.25, or more preferably between 0.05 and 0.18. In terms of substitution of the silicon atoms, between 20 and 50%, or in particular 25-35% of the silicon atoms may be bound to a monovalent organic moiety. In another preferred embodiment, such monovalent organic moieties are essentially absent, i.e. between 0 and 1% of the groups bound to silicon are such monovalent groups.

As a result, between 40 and 100%, preferably between 75 and 100% of the silicon atoms are bound to either divalent (bridging) or monovalent organic groups, or both. Similarly, if metal atoms such as yttrium, lanthanum, titanium, zirconium, hafnium, aluminium, gallium, germanium or tin atoms are present, it is contemplated that between 40 and 100%, preferably between 75 and 100% of the total of silicon and other metal atoms is bound to an organic moiety. In the percentages and ratios mentioned above, one Si—O—Si, M-O-M', or any other metal/non-metal/metal bridge counts as two groups.

Taking all silicon atoms, other metal atoms, oxygen atoms and organic groups of the microporous membranes of the invention together, the chemical composition of the microporous membrane can also be represented by the formula $Si_{1-x}M_xO_{1.4-1.96}A^1_iA^2_jA^3_k$, preferably $Si_{1-x}M_xO_{1.4-1.7}A^1_iA^2_jA^3_k$, in particular $Si_{1-x}M_xO_{1.45-1.6}A^1_iA^2_jA^3_kA^4_h$ (disregarding any hydroxyl groups that may be present), wherein M is selected from yttrium, lanthanum, titanium, zirconium, hafnium, aluminium, gallium, germanium and tin, or combinations thereof, and x=0-0.85, in particular x=0-0.5, preferably, x=0-0.35, especially x=0-0.1. Further, $A^1$, $A^2$, $A^3$ and $A^4$ are the monovalent, divalent, trivalent, and tetravalent organic moieties with the formulas —$C_rH_sQ$, —$C_mH_n$—, >$C_mH_{(n-1)}$($CH_2$)$_p$—, >$C_mH_{(n-2)}$[($CH_2$)$_p$—]$_2$, respectively, m, n, p, r and s being as defined above, and i=0.0-0.15 or 0.15-0.6, and either j=0.15-0.45 or 0.45-0.50 and k+h=0-0.2, or j=0-0.3 and k=0.1-0.4, with the proviso that i+2j+3k+4h=0.6-1.2, preferably 0.8-1.1. Herein, instead of k+h together being 0-0.2 or 0.1-0.4, k or h alone, may be 0-0.2 or 0.1-0.4, respectively, the other one being 0.

Preferably, i=0.0-0.2 or 0.2-0.5 and j=0.2-0.4 or 0.4-0.5, or i=0.0-0.2 or 0.2-0.5 and k=0.15-0.3, and most preferably i=0.0-0.25 or 0.25-0.4 and j=0.25-0.30 or 0.30-036 and k+h=0-0.1. A most preferred composition corresponds to the formula $Si_{0.9-1.0}M_{0.0-0.01}O_{1.45-1.55}A^1_{0.0-036}A^2_{0.30-0.50}$, especially $Si_{0.9-1.0}M_{0.0-0.1}O_{1.45-1.55}A^1_{0.0-01}A^2_{045-0.050}$ or $Si_{0.9-1.0}M_{0.0-0.1}O_{1.45-1.55}A^1_{0.30-036}A^2_{0.30-0.35}$.

The monovalent groups can be introduced by using monoorganyl or diorganyl silane or precursors of the formula (RO)$_3$Si($C_rH_sQ$), (RO)$_2$SiR($C_rH_sQ$), (RO)$_3$Si—{[$C_mH_{(n-1)}$X]—Si(OR)$_2$($C_rH_sQ$)-}$_q$OR, (RO)$_2$(Q$C_rH_s$)Si—{[$C_mH_{(n-1)}$X]—Si(OR)$_2$—}$_q$OR, (RO)$_2$(Q$C_rH_s$)Si—{[$C_mH_{(n-1)}$X]—Si(OR)($C_rH_sQ$)-}$_q$OR, and the like, wherein m, n, q, r, s, Q, R and X are as defined above.

Suitable examples include: (EtO)$_2$($CH_3$)SiCH$_2$Si($CH_3$)(EtO)$_2$, (EtO)$_2$($CH_3$)SiCH$_2$Si(EtO)$_3$, CH{Si($CH_3$)(EtO)$_2$}$_3$, C{Si($CH_3$)(EtO)$_2$}$_4$, C{Si(EtO)$_3$}$_4$, C{$CH_2$Si(EtO)$_3$}$_4$, (EtO)$_2$($CH_3$)SiCH$_2$CH$_2$Si($CH_3$)(EtO)$_2$, (EtO)$_2$($CH_3$)SiCH$_2$CH$_2$Si(EtO)$_3$, (EtO)$_2$($CH_3$)SiCH$_2$CH{CH$_2$Si($CH_3$)(EtO)$_2$}$_2$,(EtO)$_2$($CH_3$)SiCH$_2$C{CH$_2$Si($CH_3$)(EtO)$_2$}$_3$, (EtO)$_3$SiCH$_2$CH$_2$Si(EtO)$_2$(CH$_2$)$_2$Ph, (EtO)$_3$SiCH$_3$ (MTES), (EtO)$_3$SiCH$_2$CH$_3$, (EtO)$_3$Si(CH$_2$)$_3$Ph, (EtO)$_3$Si(CH$_2$)$_3$NH$_2$, $(EtO)_3Si(CH_2)_3SH$, $(EtO)_3Si(CH_2)_3OC(O)CH_3$, $(EtO)_3Si(CH_2)_3COOH$, $(MeO)_3SiCH_2CH_2OCH_3$, and $(MeO)_2Si(CH_3)_2$.

In a preferred embodiment, the molar ratio between divalent organic groups (having the formula $—C_mH_n—$) bound to two silicons, and monovalent organic groups (having the formula $—C_rH_sQ$) bound to one silicon is between 0.1 and 10, preferably between 0.25 and 4, most preferably between 0.5 and 2. As a useful alternative, the ratio can be ∞, i.e. no introduction of monovalent groups.

The proportion and the types of carbon-silicon bonds in the membranes of the invention can be determined e.g. using solid-state $^{29}Si$ NMR. As an alternative, samples can be incinerated in air or oxygen and the weight reduction and $CO_2$ production as a function of temperature can be determined. Further analytic methods include elemental analysis using Atomic Absorption Spectroscopy.

The membranes or molecular separation membrane layers of the invention consist of an amorphous material with a disordered array (as distinct from a periodic array) of micropores with a pore size below 1.5 nm, especially below 1.2 nm and particularly centred between 2 and 10 Å, especially between 2.2 and 7 Å. As an advantage of the invention, the membranes have a narrow pore size distribution; in particular, the pores size distribution, determined as described below, is such that pores sizes of more than 125% of the mean pore size are not present for more than 20%, or even not for more than 10%, of the average pore size. BET (Brunauer, Emmett, and Teller) and like-wise determined surface areas have been obtained by adsorption using $C_2H_2$, $CO_2$, $N_2$, $C_2H_4$, and other compounds. From this, a semi-quantitative estimate of the pore size distribution based on estimated molecular sizes such as kinetic diameters has been determined using standard procedures well-known to those skilled in the art of gas adsorption techniques. Alternatively, the Kelvin pore size and Kelvin pore size distribution are determined by perm-porometry, i.e. the gas permeance from a gas-vapour (adsorbing/condensing) gas is measured as a function of the relative pressure of the vapour. In this way progressive pore blocking by the adsorbing vapour is followed. This can be related to a pore size by recalculating the relative vapour pressure to a length scale by using the Kelvin equation:

$$d_k = -4\gamma v_m / RT \ln\left(\frac{p}{p_0}\right),$$

where $d_k$ is the pore diameter, $\gamma$ the surface tension, $v_m$ the molar volume, R the gas constant, T the temperature, p the (partial) vapour pressure and $p_0$ the saturated vapour pressure. Water was used as an adsorbing/condensing vapour and He as the non-adsorbing gas similar to e.g. Tsuru (*J. Membr. Sci.* 2001, 186, 257-265) or Huang (*J. Membr. Sci.* 1996, 116, 301-305) or Deckman (US patent application 2003/0005750).

The long-range ordering of the mesopore structure in PMO's can be determined using X-ray diffraction, and is characterised by the presence of sharp Bragg reflections at a d-spacing larger than 10 Å. Commonly used X-ray source is Cu—Kα with a wavelength of ~1.54 Å, and the Bragg reflections will appear at small angles (<10° 2θ). Under the same conditions, no Bragg reflections will be present for the amorphous microporous structure.

The porosity of the membranes is typically below 45%, e.g. between 10 and 40%, which is also indicative of a disordered array, since ordered arrays (crystals) usually have porosities above 50%.

The membranes (or microporous membrane layers) can have a thickness of e.g. between 20 and 2000 nm, and are preferably supported, e.g. on mesoporous (pore diameter between 2.0 and 50 nm) ceramic layer that has preferably been deposited on a macroporous support (pore diameter larger than 50 nm). This mesoporous layer can comprise materials such as gamma-alumina, titania, zirconia, and organic-inorganic hybrid silica and mixtures of these. The macroporous support can consist of a ceramic material such as alpha-alumina, or a metallic material such as stainless steel.

The microporous membranes of the invention have the advantages of being hydrothermally stable. As a measure of hydrothermal stability, they show a stable separation performance in the dehydration of butanol at 150° C., i.e. their separation performance in the dehydration using pervaporation of n-butanol containing 1 to 10 wt % water does not alter by more than 0.03%/day between 50 and 230 days of operation at 150° C.

The membranes of the invention can be produced by a process comprising:

(a) hydrolysing a silicon alkoxide of one of the formulas:

wherein
m, n and q and R are as defined above,
X'=H or $(CH_2)_pSi(OR)_3$, and p=0 or 1,
in an organic solvent to produce a sol of modified silicon or mixed-metal (hydr)oxide;
optionally together with one or more monometal alkoxide of the formula $(RO)_3M$, wherein M=Y, La, Al, Ga, $(RO)_4M$, $(RO)_3MZ^1$ or $(RO)_2MZ^1Z^2$, wherein M is Ti, Zr, Hf, Si, Ge, Sn, or a mixture thereof, preferably Si, $Z^1$ and $Z^2$ are independently OR or $C_rH_sQ$ as defined above, and R is as defined above;

(b) precipitating modified silicon or mixed-metal (hydr)oxide from said sol onto a mesoporous support;

(c) drying the precipitate and calcining at a temperature between 100 and 500° C., preferably between 200 and 400° C.

It is noted that in the silicon alkoxides of the formulas: $(RO)_3Si—\{[C_mH_{(n-1)}X']—Si(OR)_2\}_q(OR)$, $(RO)_3Si—[C_mH_{(n-2)}X'_2]—Si(OR)_3$, or $(RO)_3Si—C_mH_n—Si(OR)_{3-y}\{(C_mH_n)—Si(OR)_3\}_y$, one or two alkoxy groups OR per silicon atom may be replaced by a monovalent organic group e.g. having the formula $—C_rH_sQ$ as defined above, as shown in the formulas [Ia]-[VIIIa] below. The terminal Si atoms should contain at least one alkoxy groups and it is preferred that per Si atom no more than one monovalent organic group is present.

In addition to the di-, tri- or tetrasilicon alkoxide having the above formulas, the hydrolysis can be carried out in the presence of a monosilicon (and/or another monometal) alkoxide, having the formula $(RO)_3M$, $(RO)_4M$, $(RO)_3MZ^1$ or $(RO)_2MZ^1Z^2$ (or $(RO)_2MZ^1R$). Preferably at least one silicon alkoxide having a hydrocarbon group (optionally substituted) and having the formula, $(RO)_3MZ^1$ or $(RO)_2MZ_1Z^2$, most preferably having the formula $(RO)_3MZ^1$ (with M=preferably Si), is present in the hydrolysis step. Such a hydrocarbon group ($Z^1$) can be any organic fragment containing from 1 to 10 carbon atoms and the corresponding number of hydrogen atoms, such as methyl, ethyl, butyl, isooctyl, phenyl and benzyl, and may also be substituted, as explained above with reference to the formula —$C_rH_sQ$. Small alkyl groups, i.e. with 4 or less carbon atoms, especially methyl and ethyl are preferred. It is noted that R may have different meanings within the same molecule. Commercially available examples (Gelest, Inc.) include:

Y: yttrium isopropoxide, yttrium methoxyethoxide,
La: lanthanum isopropoxide, lanthanum methoxyethoxide,
Ti: tetrabutoxytitanium, diethyl-dipropoxytitanium, titanium methoxide,
Zr: tetramethoxyzirconium, zirconium isopropoxide,
f: hafnium n-butoxide, hafnium ethoxide,
Al: aluminum n-butoxide, aluminium s-butoxide bis(ethylacetoacetate),
Ga: gallium III 2,4 pentanedionate, gallium III ethoxide,
Si: tetraethoxysilane (TEOS), tetraisopropoxysilane, methyl-triethoxysilane (MTES), phenyl-trimethoxysilane, diethyl-diethoxysilane,
Ge: germanium n-butoxide, germanium ethoxide,
Sn: tin IV t-butoxide, tin IV isopropoxide,
and the ones given above.

The molar ratio of di-, tri or tetra-silicon alkoxides of formulas [Ia-VIIIa] to monometal alkoxide is preferably between 0.1 and 10, more preferably between 0.25 and 4, most preferably between 0.5 and 2. The process can also be carried out in the essential absence of a monometal alkoxide, bringing the ration above 10 up to infinity ($\infty$).

The ratio of Si—O—Si moieties and Si—$[C_mH_{(n-1)}X]$—Si moieties in the membrane produced following this process can be controlled by varying the ratio between mono-silicon atom precursor (M)—including but not limited to MTES and TEOS—and bis-silicon atoms (B) such as BTESE or tris-silicon atom precursor, and a range from 5% (M:B=10:1) to 24% (M:B=1:10), more preferably between 7% (M:B=5:1) and 23% (M:B=1:5), and most preferably between 12.5 (M:B=2:1) and 20% (M:B=1:2), or preferably from 24 to 25% (1:$\infty$).

Higher levels can be achieved by using precursors in which one silicon in bonded to two or more bridging organic moieties, such as Si—$[C_mH_{(n-1)}X]$—Si. A maximum of 40% of Si—$[C_mH_{(n-1)}X]$—Si bridging units is obtained when a precursor like $(RO)_3Si—\{—[C_mH_{(n-1)}X]—Si(OR)_2\}_3—[C_mH_{(n-1)}X]—Si(OR)_3$.

The percentage of Si—O—Si bonds being replaced by Si—$\{[C_mH_{(n-1)}X]—Si\}_q$ moieties in the membrane can be calculated as mB/(4·mB+1.5·mM), wherein mB is the mol % of the bis-silyl precursor such as BTESE and mM is the mol % of the mono-silyl precursor such as MTES. In case tetra-alkoxy precursors such as TEOS are used, the equation becomes mB/(4·mB+2·mM).

In a particular embodiment of the process of the invention, the microporous membranes are based on other metals on other metal oxides than silica, such as oxides of Y, La, Ti, Zr, Hf, Al, Ga, Ge, and Ti, especially Ti and Zr, or on mixtures of silica with such other metal oxides, wherein a metal alkoxide having the formula $(RO)_3M$ or $(RO)_4M$ (depending on the valency of the metal M) is hydrolysed together with a poly-silicon alkoxide precursor having one of the formulas [Ia]-[VIIIa], especially [Ia], in the manner described above. The molar ratio between the metal alkoxide and the polysilicon alkoxide can be between 10/90 and 90/10, especially between 25/75 and 85/15. The resulting membranes are also part of the invention and have an improved flux over membranes not containing the organic polysilicon groups.

The membranes are characterised as having a pore size of less than 2.0 nm, preferably less than 1.5 and containing between 5 and 40 mole % (based on the amount of oxygen atoms bound to the metal), preferably 8-24% of moieties having one of the formulas: Si—$\{[C_mH_{(n-1)}X]—Si\}_q$, Si—$[C_mH_{(n-2)}X_2]$—Si or Si—$C_mH_n$—Si$\{(C_mH_n)$—Si$\}_y$, especially of the formula Si—$C_mH_n$—Si.

In an alternative process of the invention, membranes can be produced by:
(a) hydrolysing one or more di- or tri-silicon alkoxides of the formula [XI]

$$(RO)_2Z^1Si—\{[C_mH_{(n-1)}X']—Si(OR)Z^1\}_q(OR) \quad [XI],$$

wherein
m, n and q and R are as defined above,
at least one group $Z^1$ is a mono-organyl group having the formula —$C_rH_sQ$ as defined above, and any remaining $Z^1$ is OR,
$X'$=H or $(CH_2)_pSi(OR)_3$, and p=0 or 1,
in an organic solvent to produce a sol of modified silicon or mixed-metal (hydr)oxide;
optionally together with one or more monometal alkoxide of the formula $(RO)_3M$, wherein M=Y, La, Al or Ga, $(RO)_4M$, $(RO)_3MZ^1$ or $(RO)_2MZ^1R$, wherein M is Ti, Zr, Hf, Si, Ge or Sn, preferably Si, and R and $Z^1$ are as defined above;
(a) precipitating and (c) drying and calcining as described above.

Using this variant of the process of the invention, the silicon-bound mono-organyl groups that may be present in the membrane structure are introduced as substituents in the bis-silicon precursor of formula [XI]. Mixture of different precursors having formula [XI], e.g. differing in the proportion of mono-organyl groups —$C_rH_sQ$ per molecule, or mixtures of a precursor [XI] and a similar precursor not containing monovalent organic groups can also be used.

The precursors to be used in the processes of the invention are either commercially available or can be produced from commercially available starting materials in a suitable solvent using an functional catalyst, following methods known in the art and making the appropriate adjustments where necessary (see for general methods e.g. Ch. Elsenbroich, A. Salzer, *Organometallics, A Concise Introduction* 1992, VCH: Weinheim, D E, Chapter 8). For example, the cyclic three-ring silsesquioxane $[(EtO)_2SiCH_2]_3$ precursor was prepared by adding a solution of $ClCH_2Si(OEt)_3$ in THF to activated Mg turnings in THF at 50° C. (see e.g. Lanskron et al., *Nature*, 302, 2003, 266; Brondani et al. *Tetrah. Lett.* 34, 2111, 1993). For example, the mono-organosilane precursors $(MeO)_2Si(CH_3)_2$, $(EtO)_3SiCH_3$ (MTES), $(EtO)_3SiCH_2CH_3$, $(EtO)_3Si(CH_2)_7CH_3$, $(EtO)_3Si(CH_2)_3NH_2$, $(EtO)_3Si(CH_2)_3SH$ as well as the bis-silyl or tris-silyl precursors $(EtO)_3Si—CH_2—Si(OEt)_3$, $(EtO)_3Si—CH_2—CH_2—Si(OEt)_3$ (BTESE), $(EtO)_3Si—(CH_2)_8—Si(OEt)_3$, $(MeO)_3Si—CH_2—CH_2—Si(OMe)_3$, $(MeO)_3Si—(CH_2)_6—Si(OMe)_3$, $(MeO)_3Si—CH_2—CH_2—(C_6H_4)—CH_2—CH_2—Si(OMe)_3$ and (1,4-bis(trimethoxysilylethyl)-benzene) can be obtained commercially (ABCR, Germany).

The hydrolysis is carried out in an organic solvent such as ethers (tetrahydrofuran, dimethoxyethane, dioxane and the like), alcohols (methanol, ethanol, isopropanol, methoxyethanol and the like), ketones (methyl ethyl ketone and the like), amides etc. Alcohols related to the alkoxide groups of the precursors, such as methanol, ethanol, and propanol, are the preferred solvents. The organic solvent can be used in a molar amount of e.g. 4 to 40 per mole of silane precursor, preferably from 6 to 30 moles per mole. Alternatively, the weight ratio between organic solvent and silane precursor can be between 1:1 and 1:10, more preferably between 1:2 and 1:3. The hydrolysis is carried out in the presence of water and, if necessary, a catalyst. The amount of water to be used depends on the hydrolysis rate of the particular silicon or metal alkoxides and the volume ratio of water to organic solvent can vary from e.g. 1:99 to 25:75, preferably from 2:98 to 15:85. The preferred molar ratio of water to silicon is between 1 and 8, more preferred between 2 and 6.

A catalyst may be necessary if hydrolysis in neutral water is too slow. An acid is preferably used as a catalyst, since an acid was found to assist in producing the desired morphology of the membrane. The amount of acid is preferably between 0.001 and 0.1 moles per mole of water, more preferably between 0.005 and 0.5 mole/mole.

The hydrolysis can be carried out by adding the water (and optionally the acid catalyst) all at once, or by adding the water in two or more portions or continuously, e.g. by dripping; it is preferred that at least 25%, more preferably at least 50% of the water, and optionally of the catalyst, is added after at least 25% of the reaction time has lapsed, e.g. after at least 0.5 h from the start of the hydrolysis reaction. Stepwise or continuous, e.g. dropwise, addition of the water and catalyst mixture suppresses multiple hydrolysis of precursor alkoxide groups, thus helping the uniform growth of particles in the sol. For silica sol preparation the conditions as described by De Lange et al. (*J. Membr. Sci.* 99 (1995), 57-75) can be followed. The reaction temperature can be between 0° C. and the boiling temperature of the organic solvent. It is preferred to use elevated temperatures, in particular above room temperature, especially above 40° C. up to about 5° C. below the boiling point of the solvent, e.g. up to 75° C. in the case of ethanol.

It was found to be important that the hydrolysis is carried out in the substantial absence of surfactants such as long-chain alkyl ammonium salts (cationic) or blocked poly-alkylene oxides or long-chain alkyl polyalkylene oxides (non-ionic) or long-chain alkane-sulphonates (anionic) and the like. Such surfactants should therefore preferably not present above a level of 0.1% (w/w) of the reaction mixture, more preferably below 100 ppm or best be completely absent.

The drying and/or calcination of the precipitate is preferably carried out under an inert, i.e. non-oxidising atmosphere, for example under argon or nitrogen. The calcination temperature is at least 100° C., up to about 600° C., preferably between 200 and 400° C., using a commonly applied heating and cooling program. The porosity of the membranes can be tuned by selecting the specific metal (hydr)oxide precursor, the appropriate hydrolysis conditions, and the appropriate consolidation parameters (drying rate, temperature and rate of calcination). Higher temperatures typically result in smaller pore sizes.

The membranes according to the invention can be used to separate relatively small molecules such as $NH_3$, $H_2O$, He, $H_2$, $CO_2$, CO, $CH_3OH$, $C_2H_5OH$, from larger molecules in the liquid or the gas phase. Specific examples include but are not limited to the separation of water molecules from small organic molecules such as $C_1$-$C_{10}$ hydrocarbons, halogenated hydrocarbons, ethers, ketones and alcohols, e.g. from ethanol, iso-propanol, and butanol. Other preferred applications lie in the field of dehydration of organic solvents or reaction mixtures, such as (trans)esterification reactions, up to temperatures of 200° C., and of Fischer-Tropsch reaction mixtures, up to temperatures of 350° C. A further preferred application includes the separation of methanol from MTBE (methyl tertiary-butyl ether). Suitable gas separation processes include $NH_3$ from $N_2$ and $H_2$.

EXAMPLES

Example 1

Production of a Hybrid Organic/Inorganic Silica Sol

The precursor BTESE (1,2-bis(triethoxysilyl)ethane, purity 96%, Aldrich) was distilled before use to remove traces of impurities and water. MTES (methyl-triethoxysilyl-ethane, purity 99%, Aldrich) was used as-received. Ethanol was dried before use with molecular sieve beads of sodium aluminium silicate with pore sizes of 1.0 nm. The precursors were separately dissolved in ethanol. MTES/ethanol (molar ratio 1:20) was added to BTESE/ethanol (molar ratio 1:20).

The reaction mixture was stirred with a magnetic stirrer in an ice bath. Water was mixed with acid solution ($HNO_3$, 65 wt %, Aldrich). Half of the acid/water mixture was added to the precursor mixture, and the sol was allowed to reflux at 60° C. for 1.5 h. Subsequently, the remaining half of the acid/water mixture was added and the reflux was continued for another 1.5h. The reaction was stopped by cooling the reaction mixture, while stirring, in an ice bath.

The molar ranges of the concentration of reactants are [BTESE]/[MTES]=(0.25-3), [$H_2O$]/([BTESE]+[MTES])= (1-7), [$H^+$]/([BTESE]+[MTES])=(0.025-0.2). The amounts of water include water introduced with the acid catalyst ($HNO_3$) and with the solvent (ethanol).

Example 2

Production of Alumina Supported Hydrophobic Silica Membranes

Gamma-alumina membranes were dip-coated with the sols produced according to example 1. The sols had a ratio [BTESE]/[MTES] of 1 and a ratio [$H_2O$]/([BTESE]+ [MTES]) of 2 (sol A, resulting in membrane A) or 4 (sol B, resulting in membrane B). The membranes were calcined at 300° C. for 3 h in a $N_2$ atmosphere with 0.5° C./min heating and cooling rates.

Tubular membranes were coated with sol B, as described by Campaniello et al. (*Chem. Commun.*, 2004, 834-835) and calcined at 300° C. for 3 h in a $N_2$ atmosphere with 0.5° C./min heating and cooling rates.

The microporous layers thus produced on the tubular membranes exhibited an average pore (diameter) size between 0.24 and 0.28 nm, as determined adsorption techniques as described above, while pore sizes above 0.30 nm were essentially absent.

The Kelvin pore size distribution as determined by permporometry of this membrane is very similar to that of a methylated silica membrane prepared according to De Vos. Pervaporation tests were carried out on the tubular membranes. The system studied was 95% n-butanol-5% water at 95° C., and 97.5% n-butanol-2.5% water at 150° C. The selectivity number for water over the alcohol is constant at ~300, for about 2 months and then decreases to 150 and remains steady. The performance at higher temperature (150° C.) is remarkably better than that of the membrane produced from a mixture of monosilicon precursors with hydrophobic groups (triethoxy-methylsilane) and mono-silicon precursors without hydrophobic groups (tetraethoxysilane) according to Campaniello et al, (above).

Figure 1:
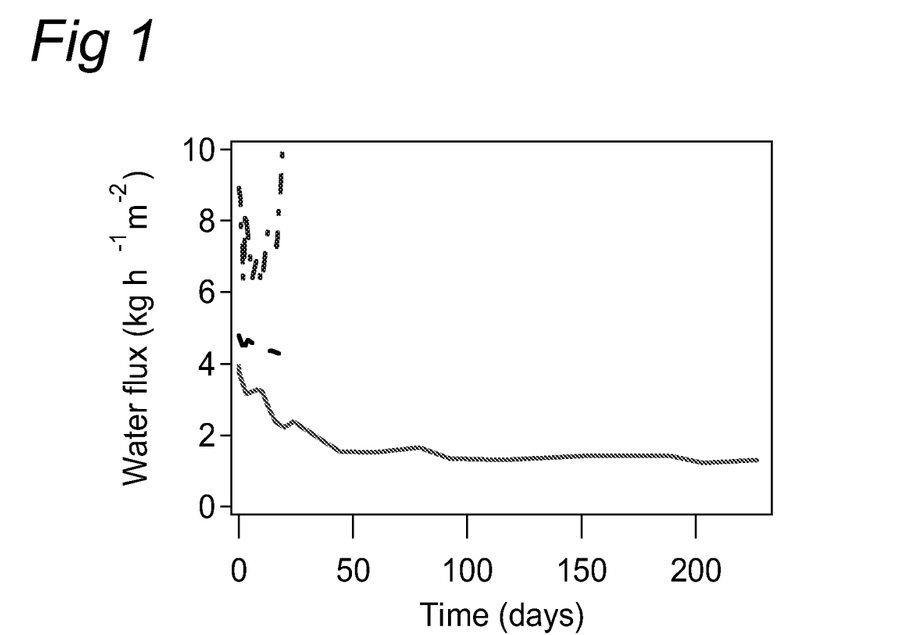
Figure 2:
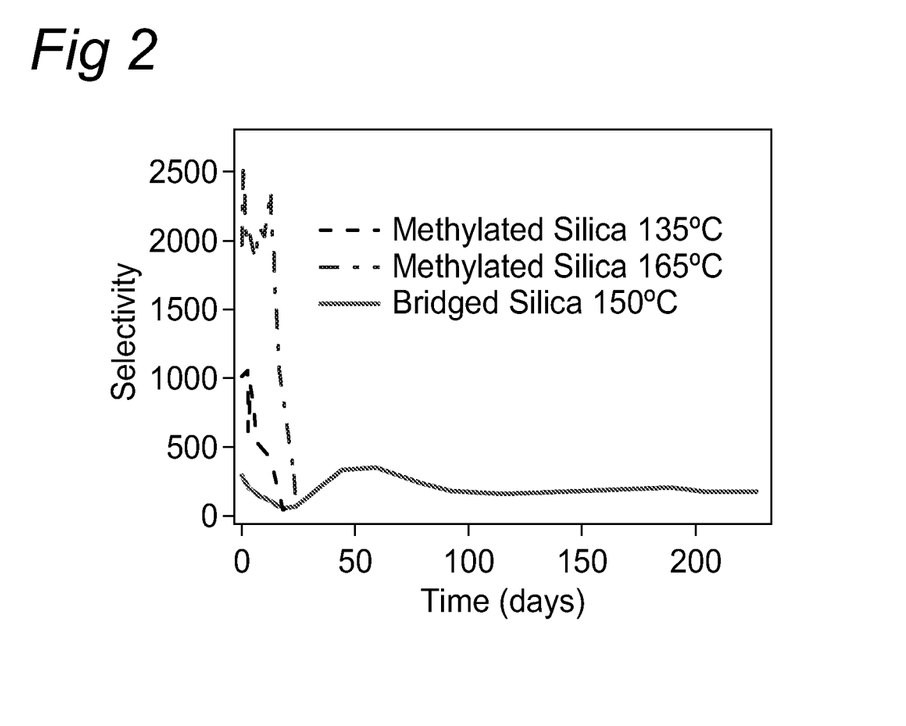

FIGS. 1 and 2 show the water flux and selectivity, respectively, through a membrane produced according to this (feed 2.5% $H_2O$, BuOH) at 150° C.

Figure 3:
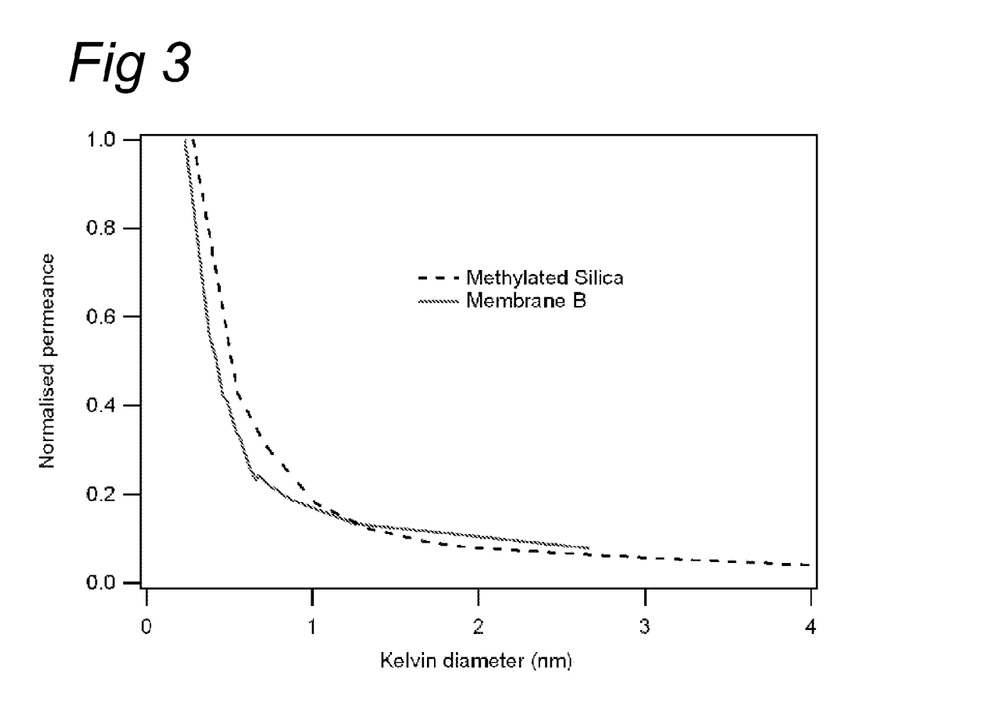

FIG. 3 shows the Kelvin pore size distribution of membrane B made according to this example (bridged silica) compared to that of a methylated silica membrane prepared according to the prior art (De Vos et al.).

Example 3

Production of a Hybrid Organic/Inorganic Silica Sol Based on BTESE

The precursor BTESE (1,2-bis(triethoxysilyl)ethane, purity 96%, Aldrich) was distilled before use to remove traces of impurities and water. Ethanol (p.a., Aldrich) was used as received. The precursor was dissolved in ethanol. This reaction mixture was stirred with a magnetic stirrer in an ice bath. Water was mixed with an acid solution ($HNO_3$, 65 wt %, Aldrich) which was diluted in ethanol. The acid/water/ethanol mixture was added dropwise to the precursor mixture, and the resulting sol was allowed to reflux at 60° C. for 2-3 h. The reaction was stopped by cooling the reaction mixture, while stirring, in an ice bath.

The molar ratios of the reactants are $[H_2O]/[BTESE]=(3-6)$, $[H^+]/[BTESE]=(0.02-0.4)$. The amounts of water include the water introduced with the acid catalyst ($HNO_3$) and with the solvent (ethanol).

Example 4

Production of Alumina Supported Hydrophobic Silica Membranes Based on BTESE

Gamma-alumina membranes were dip-coated with sols produced according to example 3. The example sol had a $[H_2O]/[BTESE]$ ratio of 6 and a $[H^+]/[BTESE]$ ratio of 0.2 (sol C, resulting in membrane C). Tubular membranes were coated with sol C, as described by Campaniello et al. (above) and calcined at 300° C. for 2 h in a $N_2$ atmosphere with 0.5° C./min heating and cooling rates.

Figure 4:
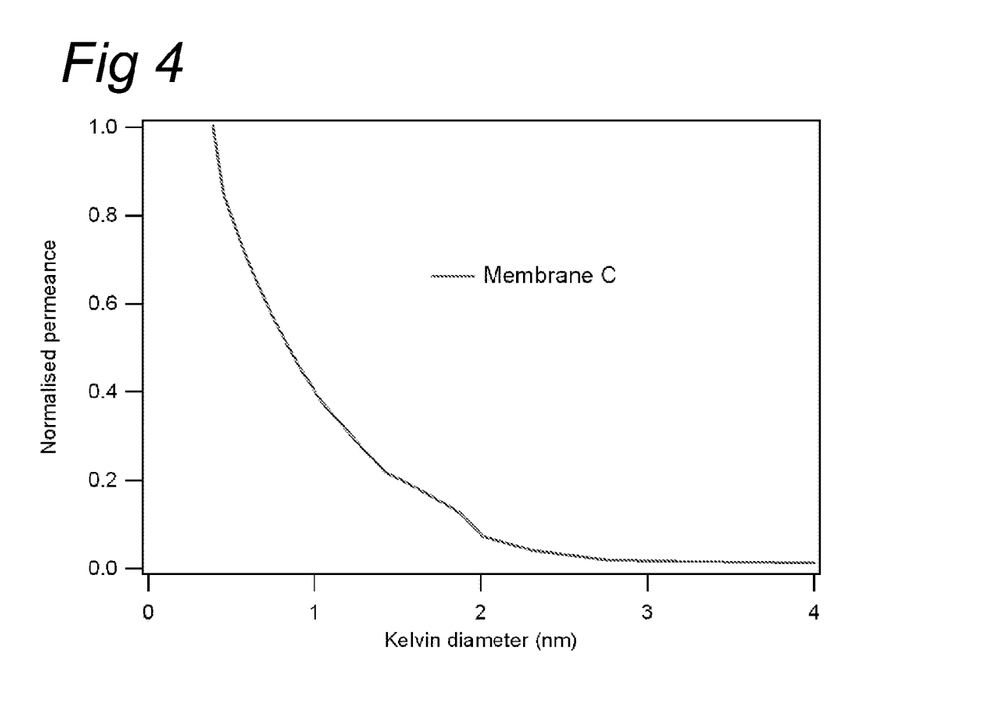

The Kelvin pore size distribution of the microporous layers thus produced on the tubular membranes exhibited a mean pore size of 0.58-0.84 nm. Mesopores larger than 2 nm were essentially absent. Pervaporation tests were carried out on these tubular membranes. The system studied was 95% n-butanol-5% water at 95° C. The selectivity number for water over alcohol ranges from 150-400. FIG. 4 shows the Kelvin pore size distribution of the membrane made according to this example (membrane C).

Example 5

Production of a Hybrid Organic/Inorganic Silica Sol Based on BTESB

The ethanol (p.a., Aldrich) was used as received. The precursor BTESB (1,4-bis-(triethoxysilyl)benzene, purity 96%, Aldrich) was dissolved in ethanol. This reaction mixture was stirred with a magnetic stirrer in an ice bath. Water was mixed with an acid solution ($HNO_3$, 65 wt %, Aldrich) which was diluted in ethanol. The acid/water/-ethanol mixture was added dropwise to the precursor mixture, and the resulting sol was allowed to reflux at 60° C. for 3 h. The reaction was stopped by cooling the reaction mixture, while stirring, in an ice bath.

The molar ratios of the concentration of reactants are $[H_2O]/[BTESB]=(3-6)$, $[H^+]/[BTESB]=(0.02-0.2)$. The amounts of water include the water introduced with the acid catalyst ($HNO_3$) and with the solvent (ethanol).

Example 6

Production of Alumina Supported Hydrophobic Silica Membranes Based on BTESB

Gamma-alumina membranes were dip-coated with sols produced according to example 5. The example sol had a $[H_2O]/[BTESB]$ ratio of 6 and a $[H^+]/[BTESB]$ ratio of 0.02 (sol D, resulting in membrane D). Tubular membranes were coated with sol D, as described by Campaniello et al. and calcined at 300° C. for 2 h in a $N_2$ atmosphere with 0.5° C./min heating and cooling rates.

Pervaporation tests were carried out on these tubular membranes. The system studied was 95% n-butanol-5% water at 95° C. The selectivity number found for membrane D for water over the alcohol is around 280.

Example 7

Production of a Hybrid Organic/Inorganic Silica Sol Based on BTESO and TEOS

The ethanol (p.a., Aldrich) was used as received. The precursors BTESO (1,8-bis-(triethoxysilyl)octane, purity 96%, Aldrich) and TEOS (tetraethoxysilane, purity 96%, Merck) in a molar ratio of 0.14 ($[BTESO]/[TEOS]$) were dissolved in ethanol. This reaction mixture was stirred with a magnetic stirrer in an ice bath. Water was mixed with an acid solution ($HNO_3$, 65 wt %, Aldrich) which was diluted in ethanol. The acid/water/ethanol mixture was added dropwise to the precursor mixture, and the resulting sol was allowed to reflux at 60° C. for 3 h. The reaction was stopped by cooling the reaction mixture, while stirring, in an ice bath.

The molar ratios of the reactants are $[H_2O]/([BTESO]+[TEOS])=(3-6)$, $[H^+]/([BTESO]+[TEOS])=(0.02-0.2)$. The amounts of water include the water introduced with the acid catalyst ($HNO_3$) and with the solvent (ethanol).

Example 8

Production of Alumina Supported Hydrophobic Silica Membranes Based on BTESO and TEOS Gamma-alumina membranes were dip-coated with sols produced according to example 7. The example sol had a $[H_2O]/([BTESE]+[TEOS])$ ratio of 4.3, a $[BTESO]/[TEOS]$ molar ratio of 0.14, and a $[H^+]/([BTESE]+[TEOS])$ ratio of 0.11 (sol E, resulting in membrane E). Tubular membranes were coated with sol E, as described by Campaniello et al. (above) and calcined at 300° C. for 2 h in a $N_2$ atmosphere with 0.5° C./min heating and cooling rates.

Pervaporation tests were carried out on these tubular membranes. The system studied was 95% n-butanol-5% water at 95° C. The selectivity number found for membrane E for water over the alcohol is around 60.

Example 9

Production of a Sol Based on BTESE and Ti(O-iPr)$_4$

A sol was prepared corresponding to example 3, but with a reaction time of 15 min (Sol F). Titanium isopropoxide (Ti(O-iPr)$_4$) was mixed with isopropanol. To this mixture, sol F was added in a molar ratio of 0.25 ($[BTESE]/[Ti(O-iPr)_4]$). To the resulting mixture was added dropwise a mixture of water, HNO3, and isopropanol. After addition, the total mixture was allowed to reflux for 1 hour at 60° C. The molar ratios of the reactants are [H$_2$O]/([BTESE]+[Ti(O-iPr)$_4$])=(2-8), [H+]/([BTESE]+[Ti(O-iPr)$_4$])=(0.02-0.4). The amounts of water include the water introduced with the acid catalyst (HNO3) and with the solvent (ethanol+isopropanol).

The invention claimed is:

1. A microporous organic-inorganic hybrid membrane based on silica, supported by a mesoporous layer, the microporous membrane having an average pore size of less than 1.5 nm, and in which between a portion of the Si—O—Si bonds have been replaced by moieties having the following formula:

$$Si-C_mH_n-Si \qquad [I]$$

in a molar ratio represented by the following formulae:

$$Si_{0.9-1.0}M_{0.0-0.1}O_{1.45-1.55}A^1_{0.0-0.1}A^2_{0.45-0.50} \qquad [A]$$

or $$Si_{0.9-1.0}M_{0.0-0.1}O_{1.45-1.55}A^1_{0.30-0.36}A^2_{0.30-0.35} \qquad [B]$$

in which:
A$^1$ is a monovalent organic moiety of the formula $C_rH_{s+1}$ bound to a silicon atom,
A$^2$ is a divalent organic moiety of the formula $C_mH_n$ bound to two silicon atoms, m=1-8, n=2m, 2m-2, 2m-4, 2m-6, or 2m-8, provided that n≧2, r=1-10, s=2r, 2r-2, 2r-4 or 2r-6, provided that s≧2, M is a metal selected from yttrium, lanthanum, titanium, zirconium, hafnium, aluminum, gallium, germanium and tin.

2. The membrane according to claim 1, in which A$^1$ is methyl.

3. The membrane according to claim 1, in which m=1-3 and n=2m, or m=6 and n=4 or 10.

4. The membrane according to claim 1, which has an average pore diameter between 0.2 and 1.2 nm.

5. The membrane according to claim 1, which shows a stable separation performance in the dehydration of butanol at 150° C.

6. The membrane according to claim 1, which has a thickness of between 20 nm and 2 μm.

7. The membrane according to claim 1, in which the mesoporous layer has been deposited on a macroporous carrier.

8. A method for separating molecules from each other and/or from organic molecules, comprising subjecting the molecules to be separated to a membrane according to claim 1.

9. The method of claim 8, in which the molecules are hydrogen, nitrogen, ammonia, or water, or a combination thereof.

10. The method of claim 8, in which the organic molecules are alkanes, alkanols, ethers, ketones, or a combination thereof.

11. The membrane according to claim 1, in which m=2.

12. A process of producing a microporous organic-inorganic hybrid membrane, the process comprising:
(a) forming a membrane membrane having an average pore size of less than 1.5 nm, and in which a portion of the Si—O—Si bonds have been replaced by moieties having the following formula:

$$Si-C_mH_n-Si \qquad [I]$$

in a molar ratio is represented by the following formula:

$$Si_{0.9-1.0}M_{0.0-0.1}O_{1.45-1.55}A^1_{0.0-0.1}A^2_{0.45-0.50} \qquad [A]$$

or $$Si_{0.9-1.0}M_{0.0-0.1}O_{1.45-1.55}A^1_{0.30-0.36}A^2_{0.30-0.35} \qquad [B]$$

in which:
A$^1$ is a movement organic moiety of the formula $C_rH_{s=1}$ bound to a silicon atom,
A$^2$ is a divalent organic moiety of the formula $C_mH_n$ bound to two silicon atoms, m=1-8, n=2m, 2m-2, 2m-4, 2m-6, or 2m-8, provided that n≧2, and r=1-10, s=2r, 2r-2, 2r-4 or 2r-6, provided that s≧2,

M is a metal selected from yttrium, lanthanum, titanium, zirconium, hafnium, aluminum, gallium, germanium and tin, and (b) supporting the membrane by a mesoporous layer.

13. The process according to claim 12, in which the hydrolysis is carried out using at least 0.8 water molecules per alkoxide group of said silicon and metal alkoxides.

14. The process according to claim 12, in which the hydrolysing is carried out in the absence of a surfactant 15. A microporous organic-inorganic hybrid membrane based on silica supported by a mesoporous layer, the microporous membrane having an average pore size of less than 1.5 nm, and in which between 5 and 24 mole % of the Si—O—Si bonds have been replaced by moieties having one of following formulas:

in which:
m=1-8,
n=2m, 2m-2, 2m-4, 2m-6, or 2m-8, provided that n≧2, and
p=0, 1, 2 or 3.

16. A microporous organic-inorganic hybrid membrane based on silica, supported by a mesoporous layer, the microporous membrane having an average pore size of less than 1.5 nm, and in which between 23 and 40% of the Si-O-Si bonds have been replaced by moieties having the following formula:

$$Si-C_mH_{n-Si} \qquad [I]$$

wherein m=1-8, and n=2m, 2m-2, 2m-4, 2m-6, or 2m-8, provided than n≧2.

* * * * *